(12) United States Patent
Ohtsuka

(10) Patent No.: US 7,522,153 B2
(45) Date of Patent: Apr. 21, 2009

(54) DISPLAYING APPARATUS AND CONTROL METHOD

(75) Inventor: Shuichi Ohtsuka, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 757 days.

(21) Appl. No.: 10/939,391

(22) Filed: Sep. 14, 2004

(65) Prior Publication Data
US 2006/0055663 A1 Mar. 16, 2006

(51) Int. Cl.
*G09G 5/00* (2006.01)

(52) U.S. Cl. .................. 345/156; 345/158; 345/173; 345/901; 395/156; 715/865

(58) Field of Classification Search .......... 345/156, 345/158, 173, 901; 395/156; 715/865
See application file for complete search history.

(56) References Cited

U.S. PATENT DOCUMENTS

| | | | | |
|---|---|---|---|---|
| 5,463,827 | A * | 11/1995 | Williams | 40/449 |
| 5,515,495 | A * | 5/1996 | Ikemoto | 715/835 |
| 6,005,535 | A | 12/1999 | Takagi et al. | |
| 7,196,689 | B2 * | 3/2007 | Moriyama | 345/156 |
| 2003/0030973 | A1 * | 2/2003 | Kirchhevel et al. | 361/681 |
| 2004/0066422 | A1 * | 4/2004 | Chandane | 345/865 |
| 2004/0173398 | A1 * | 9/2004 | Sakai et al. | 180/273 |

FOREIGN PATENT DOCUMENTS

| | | |
|---|---|---|
| EP | 0574978 A1 | 6/1993 |
| JP | 2-230313 A | 9/1990 |
| JP | 6-51898 | 2/1994 |
| JP | 06-136567 A | 5/1994 |
| JP | 07-056935 A | 3/1995 |
| JP | 09-044428 | 2/1997 |
| JP | 11-212725 | 8/1999 |
| JP | 2001-236051 | 8/2001 |
| JP | 2001-306239 | 11/2001 |
| JP | 2002-007056 | 1/2002 |
| JP | 2002-132445 | 5/2002 |

* cited by examiner

*Primary Examiner*—Bipin Shalwala
*Assistant Examiner*—Vince E Kovalick
(74) *Attorney, Agent, or Firm*—Birch, Stewart, Kolasch & Birch, LLP

(57) ABSTRACT

The displaying apparatus 100 displays a plurality of display data sequentially by updating its display. On a surface of the frame 100*a*, the displaying apparatus 100 includes a display panel 110, a bend member 120*a*, and a bend member 120*b* and both the bend member 120*a* and the bend member 120*b* have elasticity. Each of the bend member 120*a* and the bend member 120*b* is provided at an edge of the surface of the frame 100*a*. The user bends each of the bend member 120*a* and the bend member 120*b* when he wants to update the display of the display panel 110. The displaying apparatus 100 updates the display in the display panel 110 based on the deformation volume in the bend member 120.

6 Claims, 8 Drawing Sheets

DISPLAYING APPARATUS AND CONTROL METHOD

BACKGROUND OF THE INVENTION

1. Field of the Invention

The present invention relates to a displaying apparatus and a control method for a displaying apparatus. More particularly, the present invention relates to a displaying apparatus and a control method for a displaying apparatus, which can provide a user with a feeling as if the user is turning pages of a book.

2. Description of the Related Art

When reading a book by acquiring electronic data, a user operates the displaying apparatus to display the acquired electronic data. The conventional displaying apparatus updates display data, such as a page of the electronic book, by scrolling the screen or switching the display.

A person generally reads a book made by the medium of paper. Thus, it is required to give the feeling of turning pages to the user of the displaying apparatus when the displaying apparatus updates the display data

SUMMARY OF THE INVENTION

Therefore, it is one of the objects of the present invention to provide a displaying apparatus and a control method for the displaying apparatus, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a displaying apparatus includes a frame, a display panel, which is provided on a surface of said frame, a bend member, which is provided at an edge of the surface and bended by an external force, a deformation volume detector for detecting deformation volume at said bend member, and a display controller for controlling display of said display panel.

In the first aspect of the present invention, said display controller may control an updating speed of the display data displayed in said panel display. In this case, said bend member is operable to bended at least in two directions, and said deformation volume detector may further detect a bend direction of said bend member, and said display controller may further acquire a plurality of display data, of which display order is predetermined respectively, and set whether each of the display data is updated either in the display order or in an inverse order of the display order, based on the bend direction detected by said deformation volume detector. The display order may be a numerical order with respect to the display data. The displaying apparatus may further comprise a plurality of bent members, and said display controller may further acquire a plurality of display data, of which display order is predetermined respectively, and set whether each of the display data is updated either in the display order or in an inverse order of the display order, based on which said deformation volume detectors are bended. Moreover, said display controller may acquire a plurality of display data of which display order is predetermined respectively, make a decision which parts of said bend member is bended, and select display data to be displayed firstly in said display panel, from the plurality of display data of which display order is predetermined, based on a result of the decision.

According to the second aspect of the present invention, a displaying apparatus comprises, a frame, a display panel, which is provided on a surface of said frame, a plurality of bend members, each of which is sheet-like, and which is stacked each other at an edge of the surface so that each of which is operable to be bended, and a display controller for setting display data to be displayed in said display panel from plurality of the display data, based on which said deformation volume detectors are bended.

According to the third aspect of the present invention, a displaying apparatus comprises, a display panel, a contact portion, including a planer with which an user has a contact; and a display controller for setting an update speed of display data that is displayed in said panel display based on a contact position of the user in said contact portion, and updating the display data based on the updating speed that has been set.

According to the forth aspect of the present invention, a displaying apparatus comprises a display panel and a display position controller for setting a display position of one of the display data in said display panel, based on a location in a display order of the one display data, selected from the plurality of data, of which display order is predetermined.

According to the fifth aspect of the present invention, a control method for a display apparatus, comprises steps of detecting a deformation volume of a bend member, which is provided at a vicinity of an outer edge of said display apparatus, and is bended by an external force; and controlling display of said displaying apparatus based on the deformation volume that is detected.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5 is a sectional view showing a configuration of a bend member 150a as a modification of the bend member 120a.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
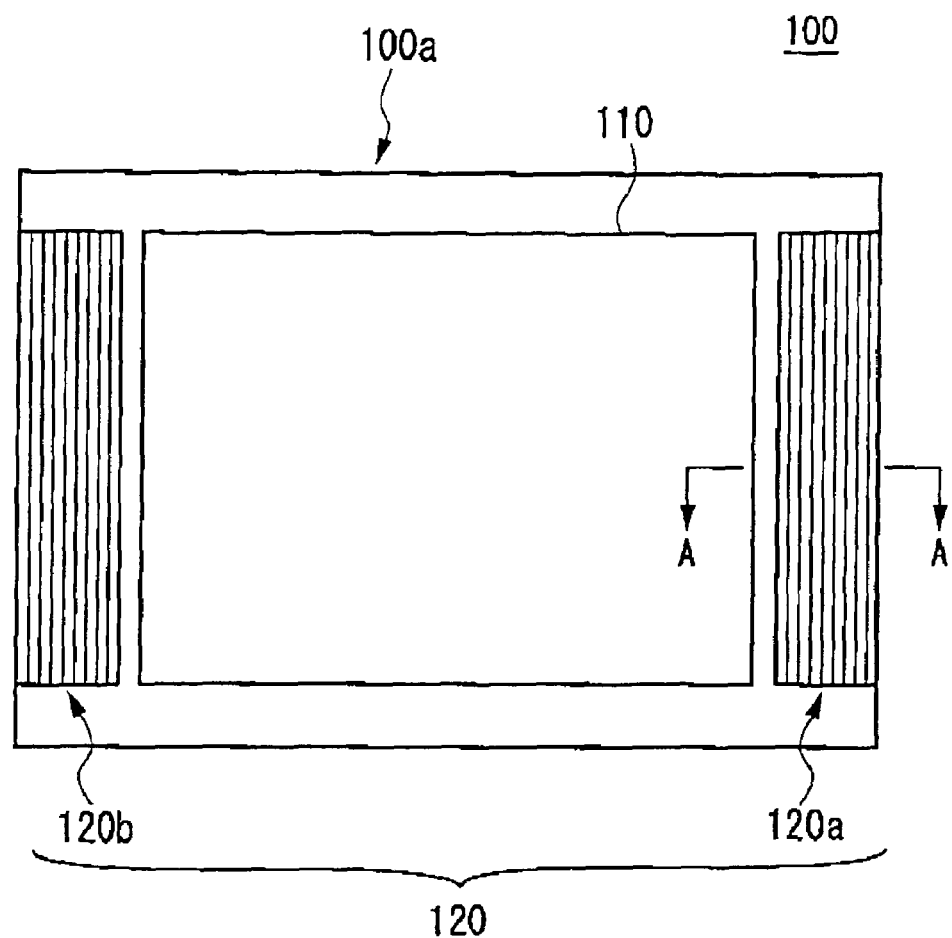
FIG. 1 is a front view of a displaying apparatus 100 according to an embodiment of the present invention.

FIG. 1 is a front view of a displaying apparatus 100 according to an embodiment of the present invention. The displaying apparatus 100 displays a plurality of display data sequentially by updating its display. On a surface of the frame 100a, the displaying apparatus 100 includes a display panel 110, a bend member 120a, and a bend member 120b and both the bend member 120a and the bend member 120b have elasticity. The bend member 120a and the bend member 120b are referred to bend member 120 hereinafter. Each of the bend member 120a and the bend member 120b is provided at an edge of the surface of the frame 100a. In addition, it is preferable that both the bend member 120a and the bend member 120b are located separately so that the user can operates the bend member 120a and the bend member 120b by each of his hands.

When reading a book, a reader turns pages as bending the book. In this embodiment, the displaying apparatus 100 updates the display in the display panel 110, based on deformation volume of the bend member 120. In other words, the user bends each of the bend member 120a and the bend member 120b when he wants to update the display of the display panel 110. Therefore, the user can get the feeling of turning the pages of a book.

In addition, each of the surfaces of the bend member 120a and the bend member 120b especially extends in a direction (for example, perpendicular direction). The displaying apparatus 100 decides a contact position of the user on the surface of the bend member 120, and sets the updating speed to update the display in the display panel 110 based on the decided contact position. Therefore, the user can change the updating speed for the display in the display panel 110 only by changing the contact position at the bend member 120.

Figure 2:
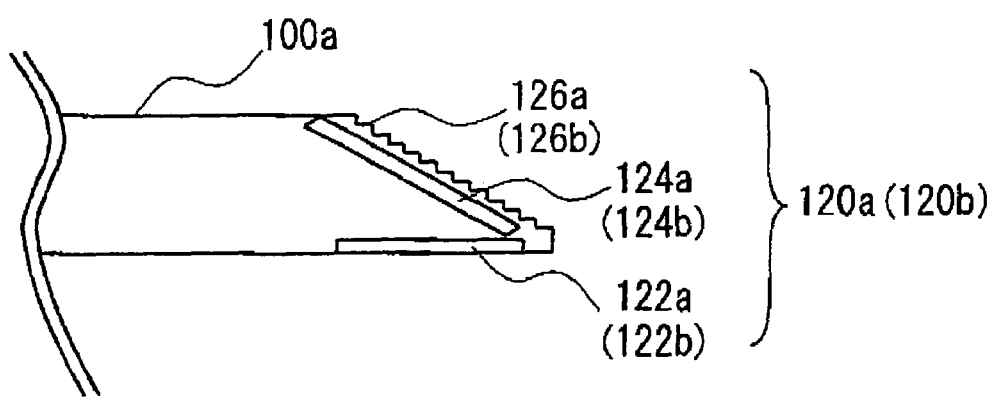
FIG. 2 is an A-A section view of the bend member 120a corresponding to the bend member 120a in FIG. 1.

FIG. 2 is an A-A section view of the bend member 120a shown in FIG. 1. The structure of the bend member 120b is the same as the bend member 120a except that the structures of bend members 120a and 120b are axisymmetrical. The bend member 120a has a deformation volume detector 122a on its bottom and a position detector 124a on its surface. The deformation volume detector 122a is a plurality of piezoelectric materials, each of which is located in certain interval along a longitudinal direction of the bend member 120a. In this case, the displaying apparatus 100 detects the deformation volume based on a voltage, which occurs according to the distortion in the piezoelectric material. For example, the position detector 124a is an electrostatic pad, and detects the contact position of the user in bend member 120a. In addition, the position detector 124a is overlapped with the deformation volume detector 122a. Accordingly, the displaying apparatus 100 can detect the contact position of the user in the bend member 120, and the deformation volume at the contact position.

Moreover, a top surface 126 on the bend member 120a includes a plurality of vertical-stripe unevenness. The unevenness is formed so that the user can recognize the height of the unevenness when the user touches the unevenness. For example, the height is equal to or less than 1 mm. The user touches the unevenness when updating the display in the display panel 110. Therefore, according to this embodiment, it is possible to get the feeling as if touching the edge part of the pages in a book.

Figure 3:
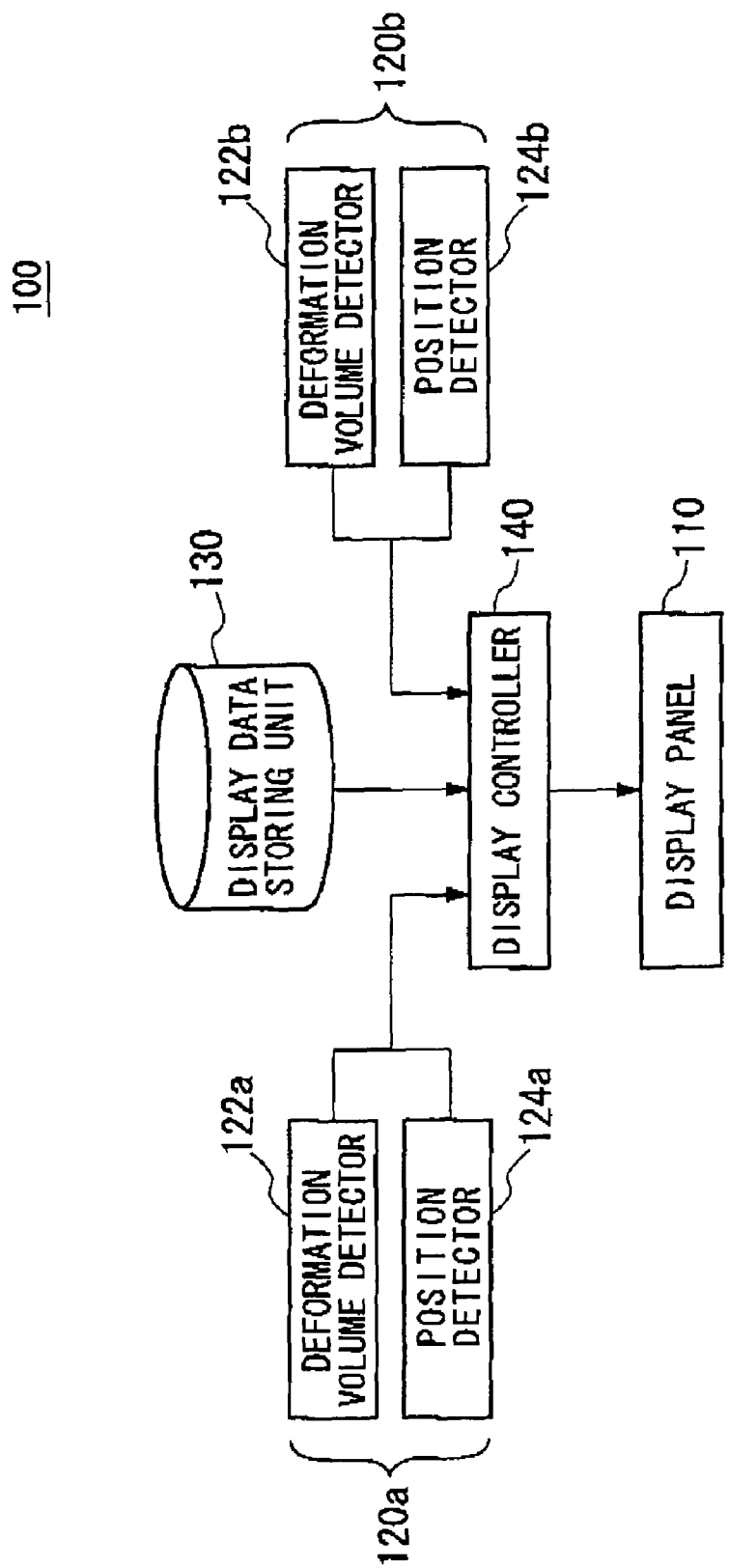
FIG. 3 is a functional configuration showing the displaying apparatus 100.

FIG. 3 is a functional configuration showing the displaying apparatus 100. The displaying apparatus 100 further includes a display data storing unit 130 and a display controller 140, besides the display panel 110, and the bend members 120a and 120b. The display data storing unit 130 stores a group of display data, which includes a plurality of display data, of which numerical order for displaying is predetermined. The group of display data is, for example, an electronic book or an electronic album. The display data is, for example, a page of the electronic book or the electronic photograph. The display controller 140 controls the display in the display panel 110, based on the results, detected by both a deformation volume detector 122a included in the bend member 120a and a deformation volume detector 122b included in the bend member 120b. The details of the operation with respect to the display controller 140 will be described with reference to a following flowchart.

Figure 4:
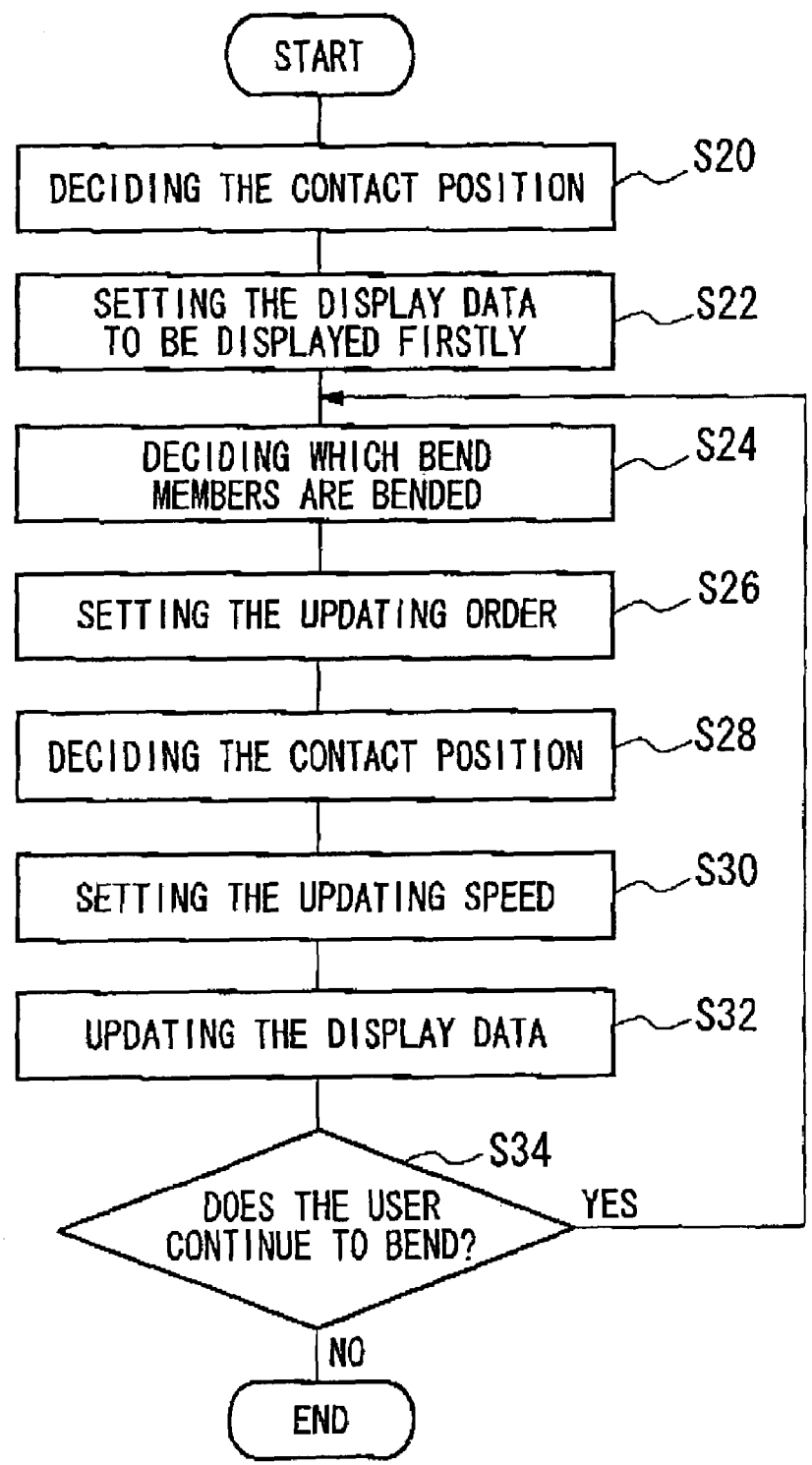
FIG. 4 is a flowchart showing an operation of a display controller 140.

FIG. 4 is a flowchart showing the operation of the display controller 140. The display controller 140 decides the contact position of the user at the bend member 120, based on each of the results of the position detector 124a and the position detector 124b (S20). Next, the display controller 140 sets the display data to be displayed firstly based on the decided contact position (S22). For example, when the user moves the contact position to an upper part at the bend member 120 shown in FIG. 1, the display controller 140 sets data of which display order is previous to the present display data, as the display data to be display firstly In this case, the display order is a numerical order with respect to the display data. When the user moves the contact position to a lower part in the bend member 120 shown in FIG. 1, the display controller 140 sets data of which display order is next to the present display data, as the display data to be display firstly.

The display controller 140 decides which of the deformation volume detector 122a and the deformation volume detector 122b the user bends, based on which of the deformation volume detector 122a and the deformation volume detector 122b detects the deformation volume (S24). In this case, the display controller 140 decides that the user has bended either the bend member 120a or the bend member 120b on the condition that the detected deformation volume exceeds a predetermined volume.

Next the display controller 140 set the updating order for updating the display data, based on the results of the decision by the bend member 120 that is bended (S26). For example, the display controller 140 sets the updating order in the display order when the display controller 140 decides that the bend member 120a has been bended, while the display controller 140 sets the updating order in an inverse order of the display order when the display controller 140 decides that the bend member 120b has been bended. In this case, the displaying apparatus 100 may change each of the sensitivities of the deformation volume detector 122a and the deformation volume detector 122b in accordance with the contact position. For example, the sensitivity is set lower as the contact position is located at upper position at the bend member 120 in FIG. 1. Thus, the possibility of updating the display data excessively despite of the intension of the user becomes low.

The display controller 140 decides the contact position of the user at the bend member 120, based on the result of the detection by the position detector 124a or by the position detector 124b (S28), and sets the updating speed of the display data based on the contact position (S30). For example, when the user moves the contact position to an upper part at the bend member 120 shown in FIG. 1, the display controller 140 speeds up the updating speed, while when the user moves the contact position to a lower part at the bend member 120 shown in FIG. 1, the display controller 140 slows down the updating speed.

After displaying the display data to be displayed firstly, the display controller 140 updates the display data, based on both the updating order and the updating speed (S32).

When the user continues to bend the bend member 120, the display controller 140 repeats the steps from S24 to S32 (S34 YES). In the step of S34, if the user does not continue to bend the bend member 120 for a predetermined time, the display controller 140 decides that the user stop bending (S34 NO), and stops updating the display data. Accordingly, the user can update the display data in the displaying apparatus 100 having a feeling as if he turns the pages bending the book.

Alternatively, the display controller 140 may set the updating speed based on the deformation volume in the bend member 120. For example, the display controller 140 speeds up the updating speed as the deformation volumes increase. In this case, the user can set the updating speed of the display data only by changing the deformation volume.

Figure 5:
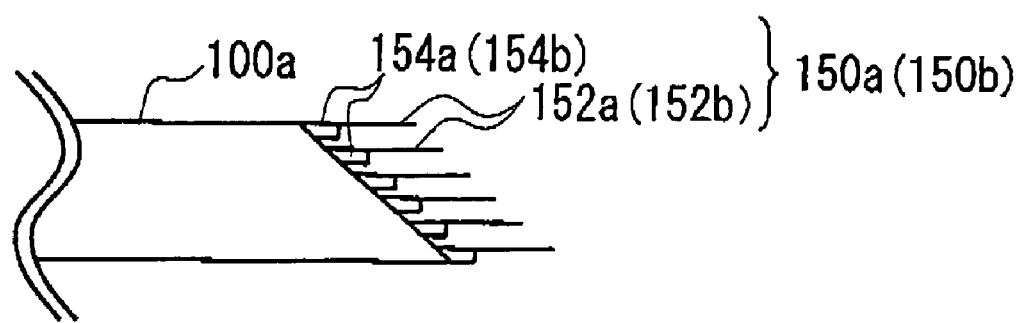

FIG. 5 is a sectional view showing a configuration of a bend member 150a as a modification of the bend member 120a. FIG. 5 corresponds to the A-A section view of the bend member 150 shown in FIG. 1. In addition, a bend member 150b, i.e. a modification of the bend member 120b, includes the same configuration as the bend member 150a.

The bend member 150 includes a plurality of sheet-like bend members 152, and a plurality of deformation volume detectors 154. Each of the sheet-like bend members 152 is stacked each other. Each of the deformation volume detectors 154 detects each of the deformation directions of the sheet-like bend members 152 and each of the deformation volumes of the sheet-like bend members 152. The sheet-like bend member 152 is for example made of elastic resin. One end of each of the sheet-like bend members 152 is fixed to the frame 100a in the displaying apparatus 100 respectively, and the other end of each of the sheet-like bend members 152 is operable to be bended respectively. Each of the deformation volume detectors 154 includes planar piezoelectric material, which is fixed to each of the sheet-like bend members 152. Each of the deformation volume detectors 154 outputs a signal of the voltage polarity and a signal of the voltage, each of which is generated on a surface of the piezoelectric element, to the display controller 140, as a signal of the bend direction and as a signal of the deformation volume in each of the sheet-like bend members 152.

The user bends the plurality of the sheet-like bend members 152 with a feeling of turning papers when inputting an indication for updating the display data to the displaying apparatus 100 according to the present modification. Therefore, the user can update the display data in the displaying apparatus 100 with the feeling of turning the pages of the book.

Figure 6:
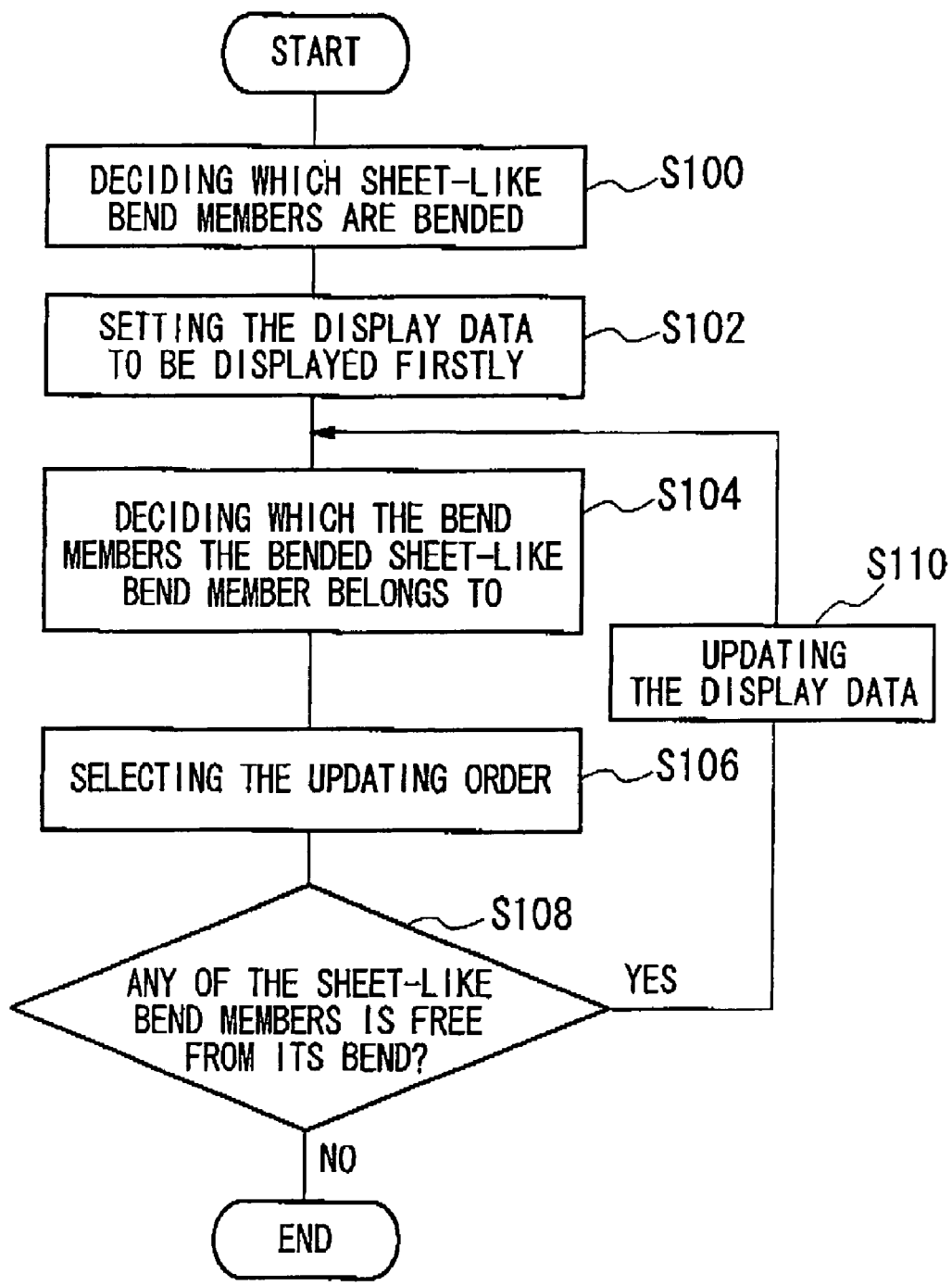
FIG. 6 is a flowchart showing the operation of the display controller 140 according to the present modification.

FIG. 6 is a flowchart showing the operation of the display controller 140 according to the present modification. The display controller 140 decides which the sheet-like bend members 152 is bended, based on in which the deformation volume detectors 154 the voltage is generated (S100). Next, the display controller 140 sets the display data to be displayed firstly, based on the result of each of the decisions of the sheet-like bend members 152. For example, the display controller 140 sets the display data, based on a stacking order in which the bended sheet-like bend members 152 are stacked. In this case, the stacking order in which plural sheet-like bend members 152 are stacked may be related to the order of the pages of the electronic book, in advance. More specifically, as the bended sheet-like bend member 152 is closer to the surface of the displaying apparatus 100, the display controller 140 sets the display data corresponding to the previous page of the electronic book, as the display data to be displayed firstly. Thus, the user can select the display data to be displayed firstly with the feeling of opening the book. In addition, when the displaying apparatus 100 of the present modification used, a plurality of sheet-like bend members 152 is usually bended by the user. In this case, the display controller 140 may select set the display data to be displayed firstly, based on the stacking order of the bended sheet-like bend member 152 which is most closely to the surface of the displaying apparatus 100, selected from the plural sheet-like bend members 152 which are bended.

Next, the display controller 140 decides that which the bend members 150 the sheet-like bend member 152 detecting the deformation volume, belongs to (S104). The display controller 140 sets the updating order of the display data, based on the result of this decision (S106).

After displaying the display data to be displayed firstly, in each time the user separates his finger from each of the sheet-like bend members 152, i.e., any of the sheet-like bend members 152 is released from its bend (S108 YES), the display controller 140 updates the display data (S110), and next the operation goes back to the S104. When none of the sheet-like bend members 152 is released from its bend for a predetermined time (S108 NO), the display controller 140 finishes the step of updating the display data. Therefore, the user can search desirable display data with the feeling of turning the pages of the book.

Figure 7:
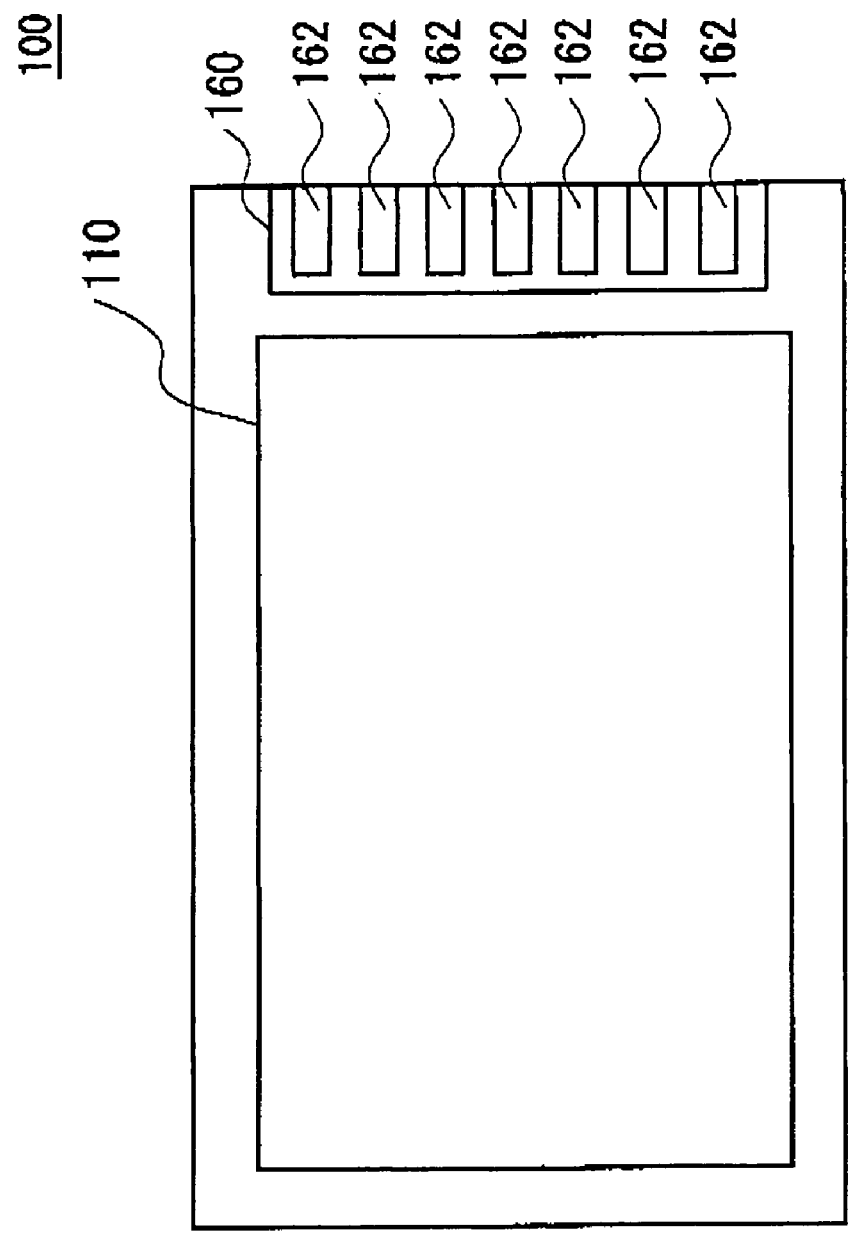
FIG. 7 is a front view showing a first modification of the displaying apparatus 100.

FIG. 7 is a front view showing a first modification of the displaying apparatus 100. According to the present modification, the displaying apparatus 100 includes one bend member 160 in place of both the bend member 120a and the bend member 120b. Other components except the bend member 160 will not describe because they have the same configuration as the displaying apparatus 100 in FIG. 3. The bend member 160 extends in one direction, such as perpendicular direction. The bend member 160 includes a plurality of deformation volume detectors 162, each of which is located in certain interval along a longitudinal direction of the bend member 160. Each of the deformation volume detectors 162 includes piezoelectric material and outputs a signal of the bend direction and a signal of the deformation volume to the display controller 140. In the present modification, the displaying apparatus 100 detects which a part of the bend member 160 the user bends. The displaying apparatus 100 selects the display data to be displayed firstly or sets the updating speed based on the results of the detections. Therefore, the user can operate the displaying apparatus 100 with one hand.

Figure 8:
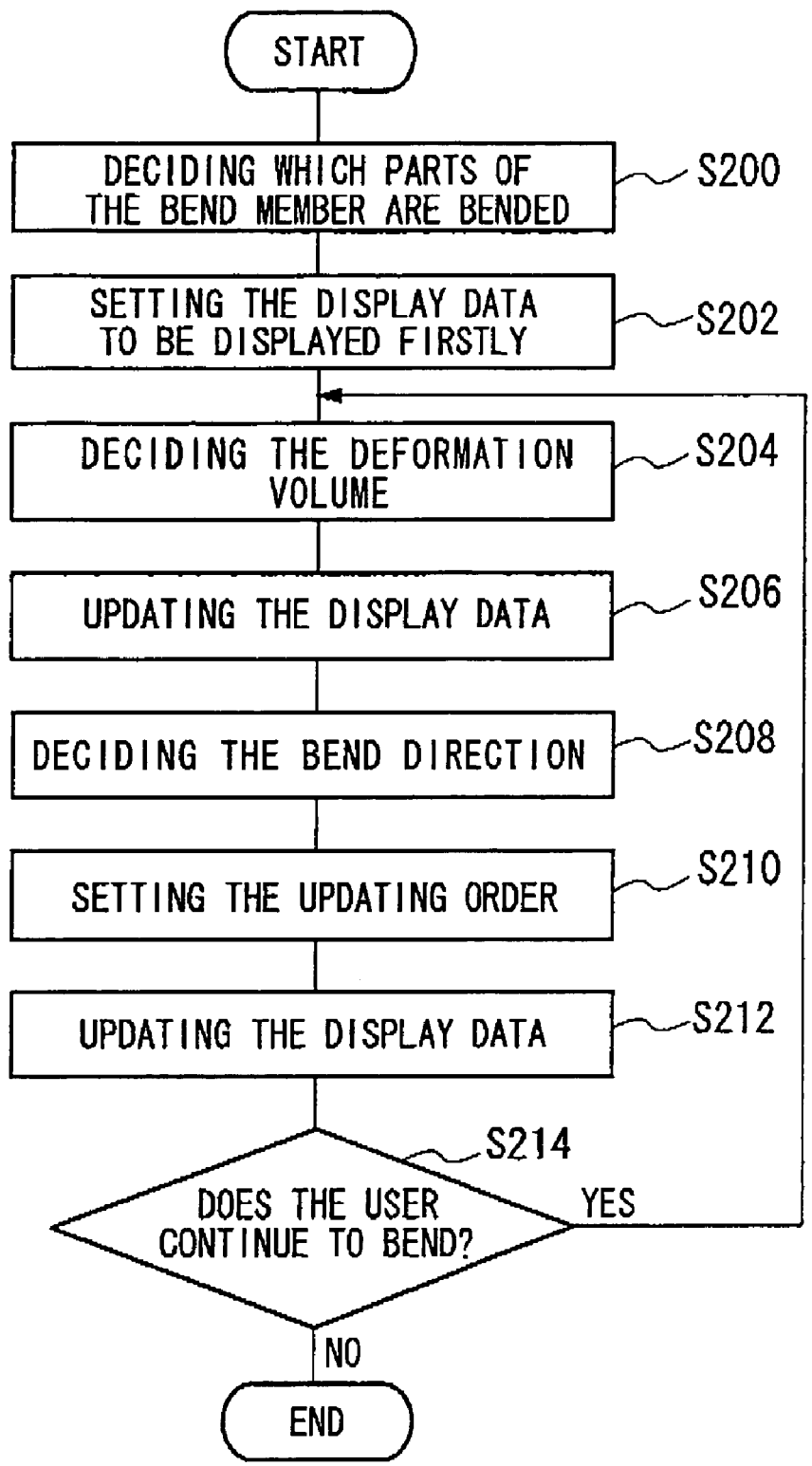
FIG. 8 is a flowchart showing another operation of the display controller 140.

FIG. 8 is a flowchart showing another operation of the display controller 140. The display controller 140 detects which a part of the bend member 160 the user bends. More specifically, the display controller 140 decides that which the deformation volume detectors 162 detects its deformation (S200). Nest, the display controller 140 sets the display data to be displayed firstly, based on the position of the bended part (S202). For example, when the user moves the bend position to an upper part in the bend member 160 shown in FIG. 7, the display controller 140 sets data of which order is previous to the present display data, as the display data to be display firstly. When the user moves the bend position to a lower part in the bend member 160 shown in FIG. 7, the display controller 140 sets data of which order is next to the present display data, as the display data to be display firstly.

Nest, the display controller 140 decides the deformation volume of the bend member 160 (S204), and sets the updating speed of the display data, based on the deformation volume that is decided (S206). For example, the display controller 140 speeds up the updating speed of the display data, as the decided deformation volume is larger.

Next the display controller 140 decides the bend direction at the bend member 160 (S208), and sets the order for updating the display data based on the bend direction that is decided (S210). Next, the display controller 140 updates the display data, based on both the updating speed and the updating order (S212). The display controller 140 repeats the steps from S204 to S212, as long as the user continues to bend the bend member 160 (S214).

Thus, according to this modification, the user can input both the updating speed and the updating order of the display data, by bending a particular part in a particular direction. Therefore, the operation required to the user become simple.

Figure 9:
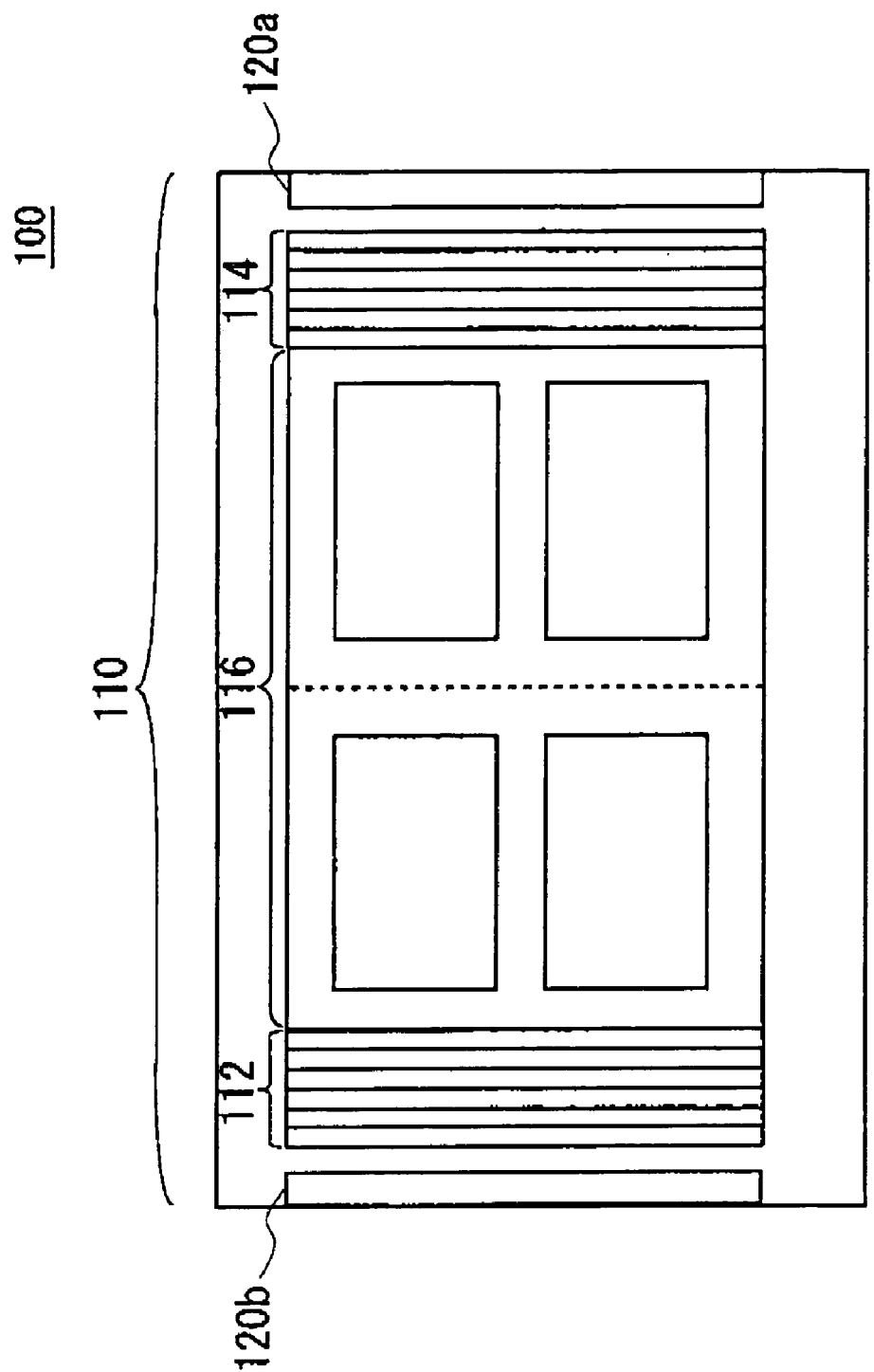
FIG. 9 is a front view showing a second modification of the displaying apparatus 100.

FIG. 9 is a front view showing a second modification of the displaying apparatus 100. In this modification, the display controller 140 displays the display data in a display region 116 except for both a space 112 and a space 114. The space 112 is provided at the left side of the display panel 110 and the space 114 is provided at the right side of the display panel 110. In this case, the display controller 140 decides the width of the space 112 based on the quantity of display data, of which orders are previous to the order of the present display data in the display region 116. Also, the display controller 140 decides the width of the space 112 based the data amount of the display data, of which orders are next to the present display data in the display region 116. Thus, the display region 116 is changed according to a location in a display order of the present display data in the all display data. More specifically, both a position of a boundary between the space 112 and the display region 116, and a position of a boundary between the space 114 and the display region 116 are changed according to the location in the display order of the present display data. Therefore, the user can visually recognize the location in the display order of the present display data, based on the display position of the display data in the display panel 110.

In addition, the display controller 140 preferably keeps a total length of the width of the space 112 and the width of the space 114. In this case, the display controller 140 displays the width of the region for displaying the display data, i.e. the width of the display region 116, to be constant without relaying on the display order of the display data.

In addition, the display panel 110 displays a plurality of vertical lines in both the space 112 and the space 114. Accordingly, it is possible to provide the image of opening the book for the user. Moreover, the display panel 110 displays a vertical line as a dot line in the middle of the region for displaying the display data, i.e. in the middle of the display region 116. Therefore, it is possible to give the image of opening the book to the user. According to the present invention, it is possible to give the feeling of turning the pages of the book to the user.

Although the present invention has been described by way of exemplary embodiments, it should be understood that those skilled in the art might make many changes and substitutions without departing from the spirit and the scope of the present invention which is defined only by the appended claims.

What is claimed is:

1. A displaying apparatus comprising:
a frame;
a display panel, which is provided on a surface of said frame;
a plurality of bend members, each of which is sheet-like, and is stacked each other at an edge of the surface so that each of which is operable to be bended; and
a display controller for setting display data to be displayed in said display panel from plurality of the display data, based on which a deformation volume detector is bended;
wherein said display controller controls an updating speed of the display data displayed in said panel display;
wherein said bend member is operable to bended at least in two directions,
said deformation volume detector further detects a bend direction of said bend member, and
said display controller further acquires a plurality of display data, of which display order data is predetermined respectively, makes a decision which parts of said bend member is bended and sets whether each of the display data is updated either in the display order or in an inverse order of the display order, based on the bend direction detected by said deformation volume detector.

2. A displaying apparatus comprising:
a display panel; and
a contact portion, including a plane with which an user has a contact; and
a display controller for setting an update speed of display data that is displayed in said panel display based on a contact position of the user in said contact portion, and updating the display data based on the updating speed that has been set;
wherein said contact portion is operable to bended at least in two directions,
said display controller further acquires a plurality of display data, of which display order data is predetermined respectively, makes a decision which parts of said contact portion is bended and sets whether each of the display data is updated either in the display order or in an inverse order of the display order, based on a detected bend direction.

3. A control method for a display apparatus, comprising steps of:
detecting a deformation volume of a bend member, which is provided at a vicinity of an outer edge of said display apparatus, and is bended by an external force; and
controlling display of said displaying apparatus based on the deformation volume that is detected and controlling an updating speed of a display data; and
detecting a bend direction of said bend member, and acquiring a plurality of display data, of which display order data is predetermined respectively, making a decision which parts of said bend member are being bended and setting whether each of the display data is updated either in the display order or in an inverse order of the display order, based on the bend direction detected.

4. A displaying apparatus comprising:
a frame;
a display panel, which is provided on a surface of said frame;
a bend member, which is provided at an edge of the surface and bended by an external force;
a deformation volume detector for detecting deformation volume at said bend member; and
a display controller for controlling display of said display panel;
wherein said display controller controls an updating speed of display data displayed in said display panel; and
wherein said bend member is operable to bended at least in two directions,
said deformation volume detector further detects a bend direction of said bend member, and
said display controller further acquires a plurality of display data, of which display order data is predetermined respectively, and sets whether each of the display data is updated either in the display order or in an inverse order of the display order, based on the bend direction detected by said deformation volume detector.

5. A displaying apparatus comprising:
a frame;

a display panel, which is provided on a surface of said frame;

a bend member, which is provided at an edge of the surface and bended by an external force;

a deformation volume detector for detecting deformation volume at said bend member; and a display controller for controlling display of said display panel;

wherein said display controller controls an updating speed of the display data displayed in said panel display;

further comprising a plurality of bent members, wherein said display controller further acquires a plurality of display data, of which display order is predetermined respectively, and sets whether each of the display data is updated either in the display order or in an inverse order of the display order, based on which said deformation volume detectors are bended.

6. A displaying apparatus comprising:

a frame;

a display panel, which is provided on a surface of said frame;

a bend member, which is provided at an edge of the surface and bended by an external force;

a deformation volume detector for detecting deformation volume at said bend member; and a display controller for controlling display of said display panel;

wherein said display controller controls an updating speed of the display data displayed in said panel display; and wherein said display controller acquires a plurality of display data of which display order is predetermined respectively, makes a decision which parts of said bend member is bended, and selects display data to be displayed firstly in said display panel, from the plurality of display data of which display order is predetermined, based on a result of the decision.

* * * * *